JOHN KINHART.
Improvement in Harrows.

No. 123,025. Patented Jan. 23, 1872.

Witnesses:
Fredk Neto
J. C. Evans

Inventor:
John Kinhart
by his attys A. H. & R. K. Evans 123,025

UNITED STATES PATENT OFFICE.

JOHN KINHART, OF ATHENS, ILLINOIS.

IMPROVEMENT IN HARROWS.

Specification forming part of Letters Patent No. 123,025, dated January 23, 1872.

*To all whom it may concern:*

Be it known that I, JOHN KINHART, of Athens, in the State of Illinois, have invented an Improvement in Harrows, of which the following is a full, complete, and exact description, reference being had to the accompanying drawing which makes a part of this specification.

Figure 1:
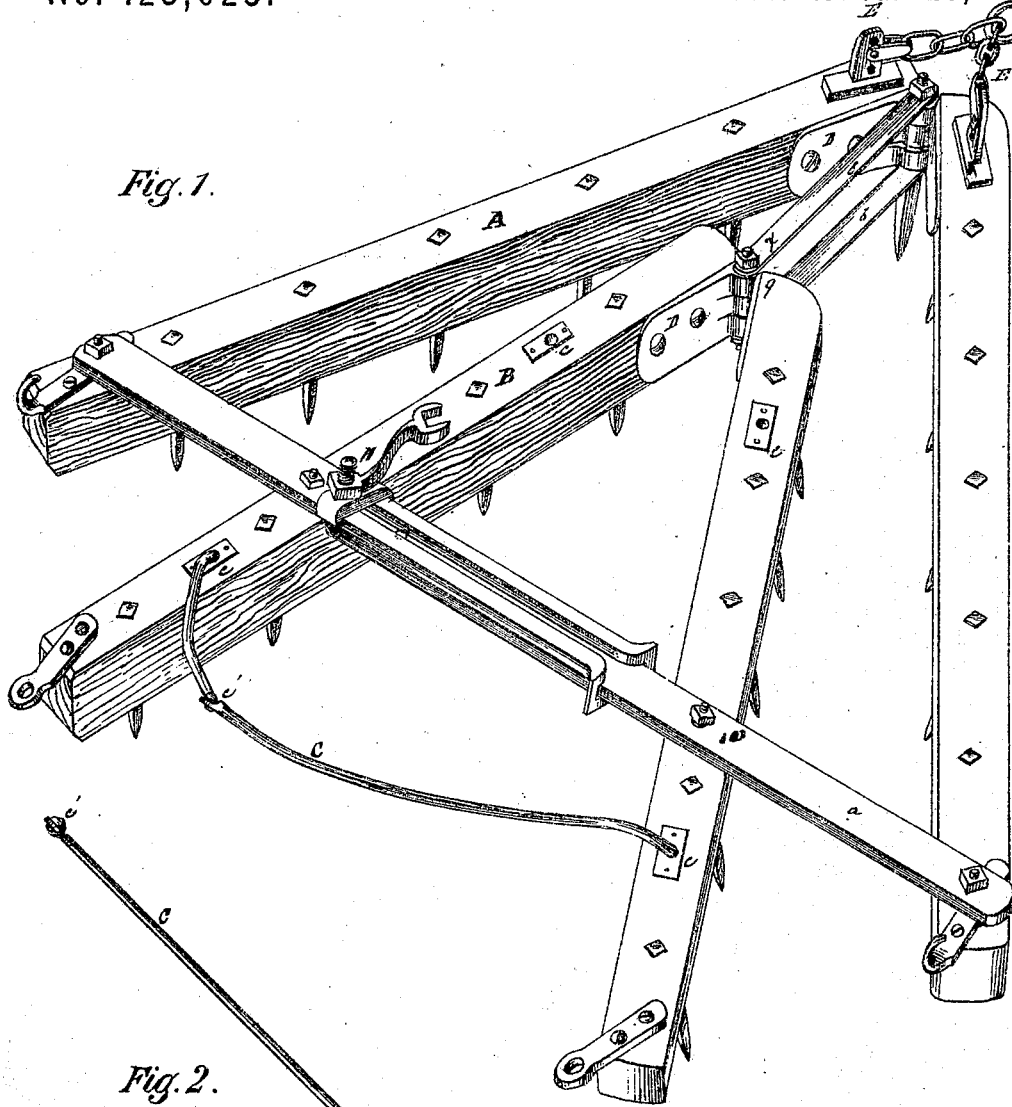
Figure 2:
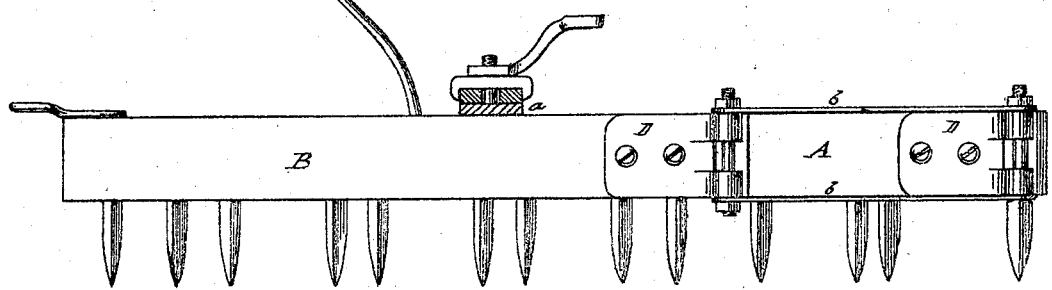

Figure 1 is a perspective view of my improved harrow. Fig. 2 is a longitudinal sectional view through the line $x\ x$ on Fig. 1.

My invention relates to the combination and arrangement of what is known as a double-A harrow, so as to make it both flexible and adjustable.

To enable others skilled in the art to understand and use my improved harrow, I will proceed to state the exact manner in which I have carried out my improvement.

A and B represent two harrows with teeth arranged in the ordinary manner, and having across them the adjustable bar $a$, as shown in my former patent before referred to. The harrow B is attached to the harrow A by means of the metallic springs $b\ b$, as shown in Fig. 2. These springs are made sufficiently thin and light to allow either harrow A or B to rise and fall, to adapt itself to the uneven surface of the ground, independently of the other, and at the same time to hold each part to its work. The guiding-yoke C, instead of being fastened with a bolt, as in my former patent, I now construct with pointed ends, and shoulders if necessary, and these points fit into the holes $c\ c$, and are secured below with nuts. The guiding-yoke is hinged at $c'$ so as to render it easily adjustable. The sides of the harrows are connected at the front points by means of hinges D, thus securing the easier adjustability of the harrow. The front harrow is provided with uprights E E, having a series of holes for the drawing-chain, so as make the harrow run deep or shallow, as desired.

In order to convert my adjustable and flexible double-A harrow into two one-horse harrows, take out bolts 9, 10, and 11, remove the strap at 9, and put back the bolt. Then lift the harrow A away from harrow B, uncouple the cross-bar, and take the slotted portion and secure it upon the bolts 10 and 11. The harrow B is then adjustable; and by the addition of a common clevis to the harrow B I have two nice one-horse harrows. The solid portion of the cross-bar $a$ has a hole in each end for securing the sides of the harrow A.

Claim.

Having thus described my invention, what I claim as new, and desire to secure by Letters Patent, is—

The double-A harrow, constructed as described, with the two portions connected together by the flexible metallic springs $b\ b$, substantially as and for the purpose set forth.

JOHN KINHART.

Witnesses:
H. S. CLARK,
I. SELIGMAN.